E. BURHORN.
COOLING TOWER.
APPLICATION FILED APR. 1, 1912.
1,092,334.  Patented Apr. 7, 1914.
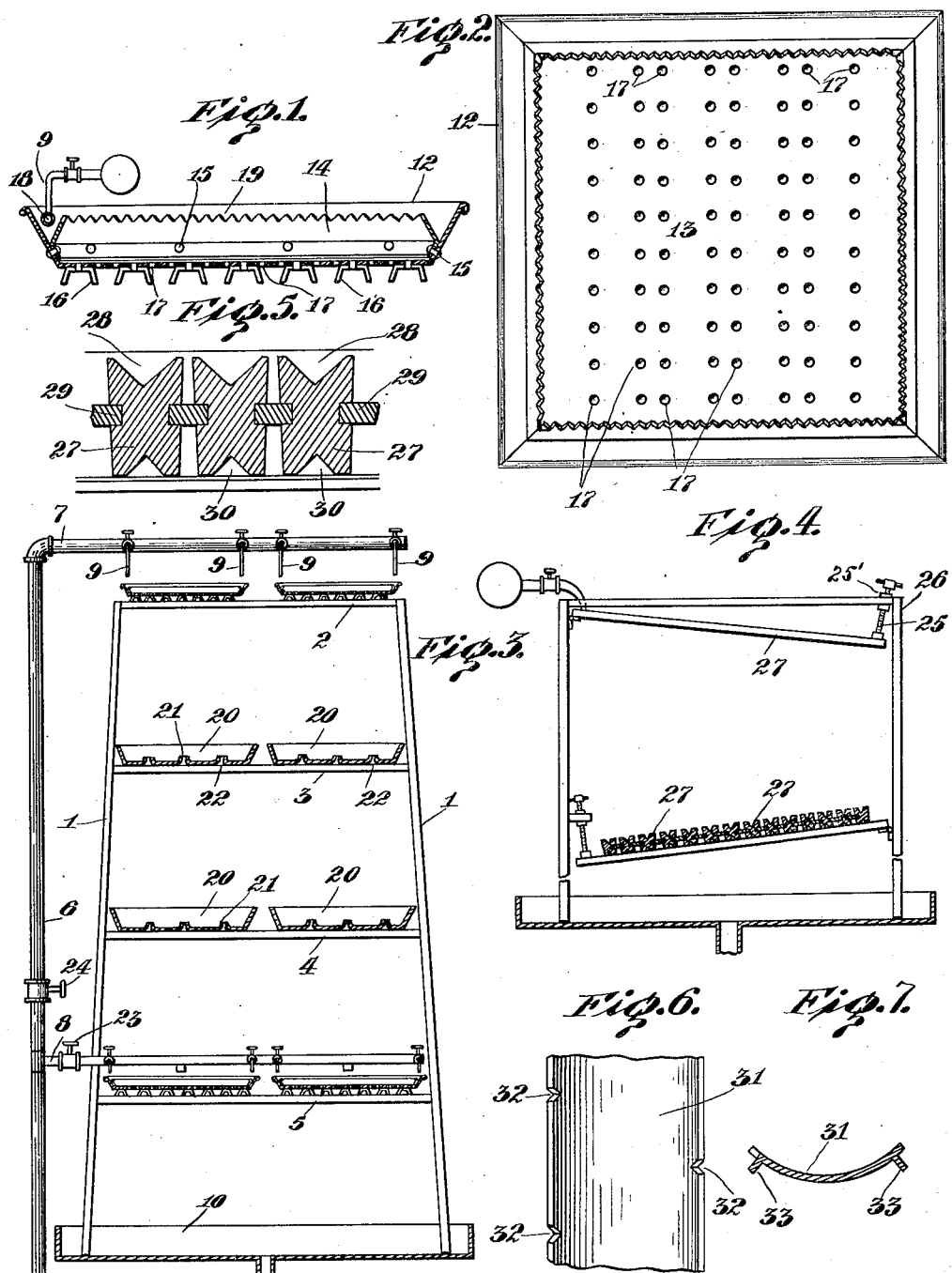
Witnesses:
C. S. Ashley
J. J. Donohue
Inventor
Edwin Burhorn
By his Attorney
Andrew Toner Jr.

UNITED STATES PATENT OFFICE.

EDWIN BURHORN, OF HOBOKEN, NEW JERSEY.

COOLING-TOWER.

1,092,334.  Specification of Letters Patent.  Patented Apr. 7, 1914.

Application filed April 1, 1912. Serial No. 687,609.

*To all whom it may concern:*

Be it known that I, EDWIN BURHORN, a citizen of the United States, residing at the city of Hoboken, in the county of Hudson and State of New Jersey, have invented certain new and useful Improvements in Cooling-Towers, of which the following is a specification.

My invention relates to improvements in cooling towers, and the object of my invention is to provide a device for cooling liquids.

I accomplish this object by the device illustrated in the accompanying drawings, in which—

Figure 1 is a sectional view of my improved pan. Fig. 2 is a plan view of the pan. Fig. 3 is an elevation with parts in section of one form of my improved cooling tower. Fig. 4 is a view of an optional form of the same. Fig. 5 is a sectional view of an optional form of the deck. Fig. 6 is a plan view of an optional form of the deck section, with parts broken away, and Fig. 7 is a sectional view of the same.

Similar characters refer to similar parts throughout the several views.

My device comprises a tower or frame work provided with a plurality of supports 1, 1 and with a plurality of decks 2, 3, 4, 5. The water or liquid to be cooled is delivered to the device through a supply pipe 6, having one or more branch pipes 7, 8 extending over a deck or decks of the device. The water is discharged from one of the branch pipes 7 through spouts 9, 9, 9 upon the upper deck, from which it falls to the deck or decks below, at each of which decks the water is divided by suitable devices into fine spray, and falls into a receiving pan 10 from which it is discharged by the pipe 11.

I prefer to use upon the top deck the pan shown in Figs. 1 and 2, which is provided with a trough-like marginal section around its perimeter, formed by the flaring sides 12 of the pan 13 and the inwardly flared pieces 14 secured to the sides 12 by means of rivets 15, 15 or in any other suitable manner. On the underside of the pan 13 I provide a series of angle pieces 16, 16 preferably riveted to the bottom of the pan, and arranged with their downwardly flaring side sections lying below the perforations 17, 17 formed in the bottom of the pan. The operation of this form of pan is as follows: The water is delivered through the branch pipe 7 and spouts 9, which spouts may terminate in a T 18, into the gutter formed at the margin of the pan, between the side 12 of the pan and the inwardly flared piece 14. When the gutter is filled, the water will overflow through the notches 19 which may be of any desired shape, and the water will fall through the perforations 17 in the bottom of the pan 13 upon the flaring sides of the angle pieces 16 from which it will fall in fine spray to the pans 20 of the deck below, and thence from deck to deck to the receiving pan 10.

An optional form of pan 20 is shown in Fig. 3, and comprises a pan having orifices in its bottom with an annular bead 21 surrounding each orifice. The advantage of this arrangement is that small particles of sediment in the water will be deposited in the bottom of the pan, and will be prevented from clogging the orifices 22, 22 by reason of their surrounding bead 21. I preferably provide at one or more decks of the tower, branch pipes 8, each provided with a valve 23 so that under certain atmospheric conditions the upper part of the tower may be cut off, and the water be supplied to one or more of the lower decks. When the branch pipes leading to the lower decks are used as above set forth, the water may be cut off from the upper decks by means of the valve 24 suitably placed in the riser 6.

Under certain atmosphere conditions, as for instance, in a high wind, the water is frequently blown from the towers of the usual form, and to prevent this I provide the arrangement illustrated in Fig. 4 which comprises a series of decks provided with means for tilting or inclining the same. I preferably use for this purpose a screw 25 at one end of the adjustable deck and turning in the threaded socket member 25' provided in the frame 26 whereby the deck may be tilted or inclined as may be found necessary by reason of the air currents. I have shown this screw 25 provided at one side of the deck, but it is apparent that the screw as shown may be applied at each corner of the deck or decks of the tower, whereby the decks may be inclined in any direction and my invention contemplates this arrangement.

I do not intend to limit myself to any particular form of deck, as varying atmospheric conditions require various details of construction. An optional form of deck is illustrated in Fig. 5, in which I provide a series of slats 27, 27 preferably provided with longitudinal channels 28 in their upper surfaces, which channels are closed at both ends and the slats being separated by splines 29 set between the slats 27, 27. In this form of deck I preferably provide a longitudinal channel 30 in the underside of the slats 27 whereby the water will be caused to fall from the sides of the slats instead of seeking the center, thus accomplishing the desired division of the water into fine spray. I have preferably arranged the slats of each deck at right angles to the slats of the adjacent decks.

An optional form of slat of which the deck is comprised is illustrated in Figs. 6 and 7 in which I provide an elongated trough or pan 31 closed at both ends and provided with marginal cut-out openings 32, 32 preferably staggered, and with longitudinal, strengthening and supporting the ribs 33, 33 on the underside of the marginal side sections whereby the water overflowing through the openings 32, 32 will run down upon the ledges 33, 33 and drop therefrom in fine spray to the decks below.

Having thus described my invention what I claim is:

1. In a cooling tower, a deck comprising a pan provided with a marginal notched gutter section and a perforated bottom, and angle pieces on the underside of the pan having flaring side sections extending below the perforations in the bottom of the pan.

2. In a cooling tower, a deck comprising a pan fitted with a trough-like section around its perimeter so arranged that the water will overflow the inside edge of the trough to distribute the water over the bottom of the pan.

3. In a cooling tower a distributing pan having discharge apertures in its bottom, and a water receiving trough on the side of the pan above the discharge openings, one wall of the trough being of less height than the other to permit overflow of the water from the trough toward the discharge openings.

4. In a cooling tower a distributing pan having discharge apertures in its bottom, a water receiving trough on the side of the pan above the discharge openings, one wall of the trough being of less height than the other to permit overflow of the water from the trough toward the discharge openings, and means carried by the pan below the same to receive the water from the discharge openings.

In testimony whereof I, EDWIN BURHORN, have signed my name to this specification in the presence of two subscribing witnesses, this 22nd day of March 1912.

EDWIN BURHORN.

Witnesses:
A. BOULOGNE,
S. R. JOHNSON.

---

Copies of this patent may be obtained for five cents each, by addressing the "Commissioner of Patents, Washington, D. C."